Oct. 22, 1929.   M. SEDLMEIR   1,732,732
FUEL VALVE FOR COMBUSTION ENGINES
Filed Aug. 17, 1926   3 Sheets-Sheet 2
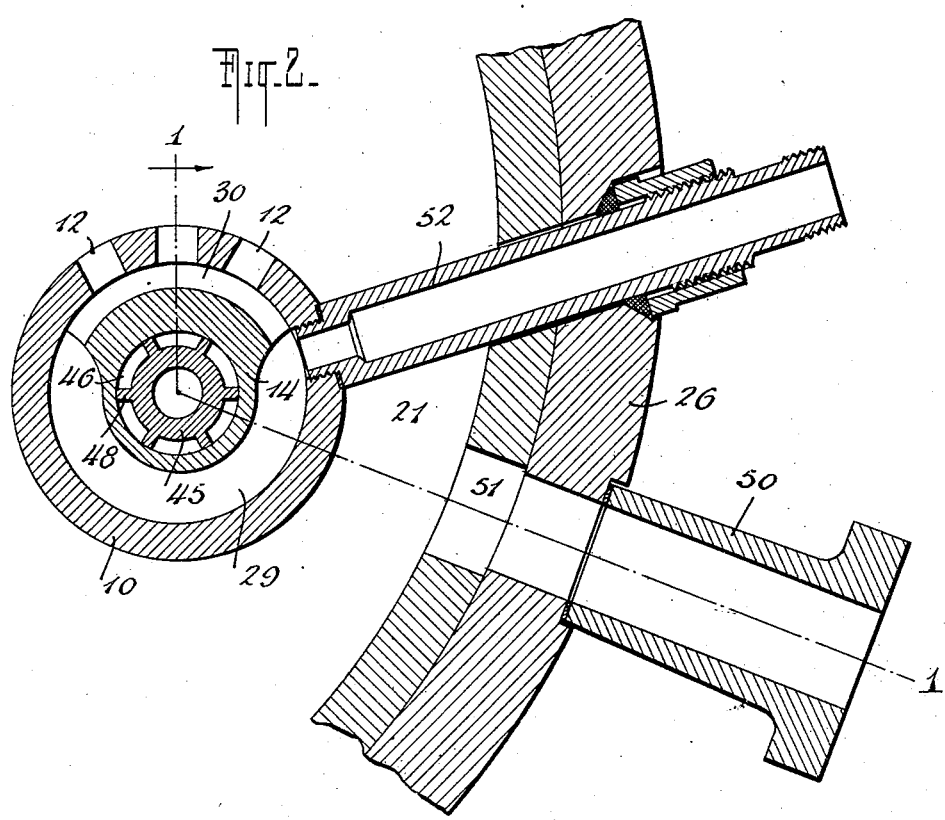
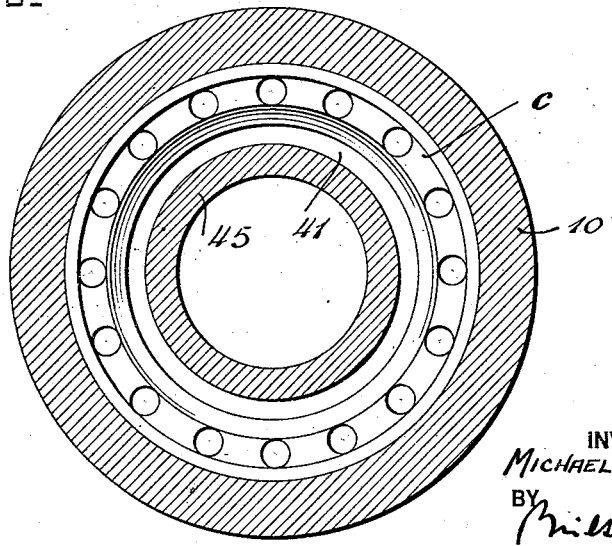
INVENTOR
MICHAEL SEDLMEIR
BY
ATTORNEYS

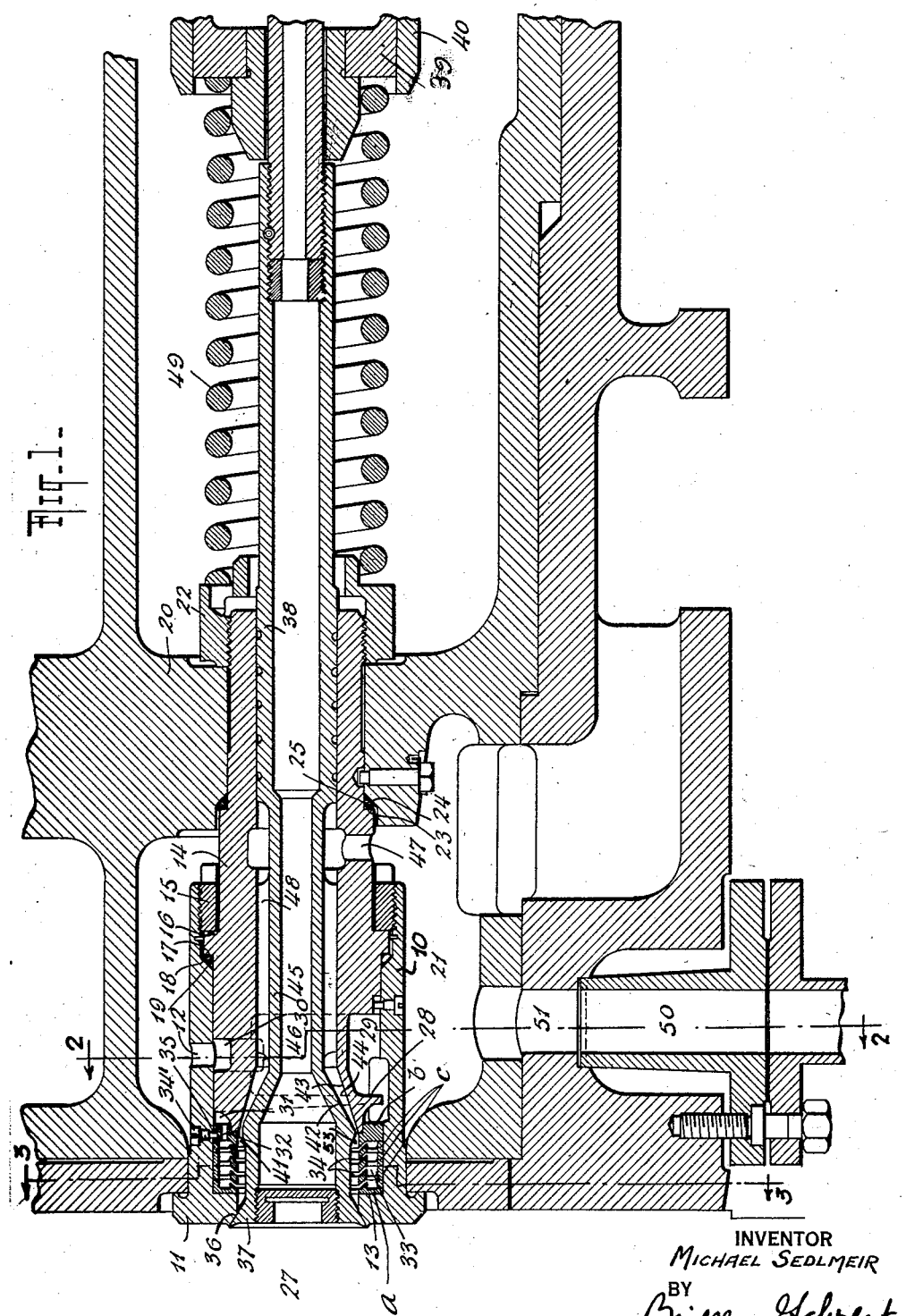

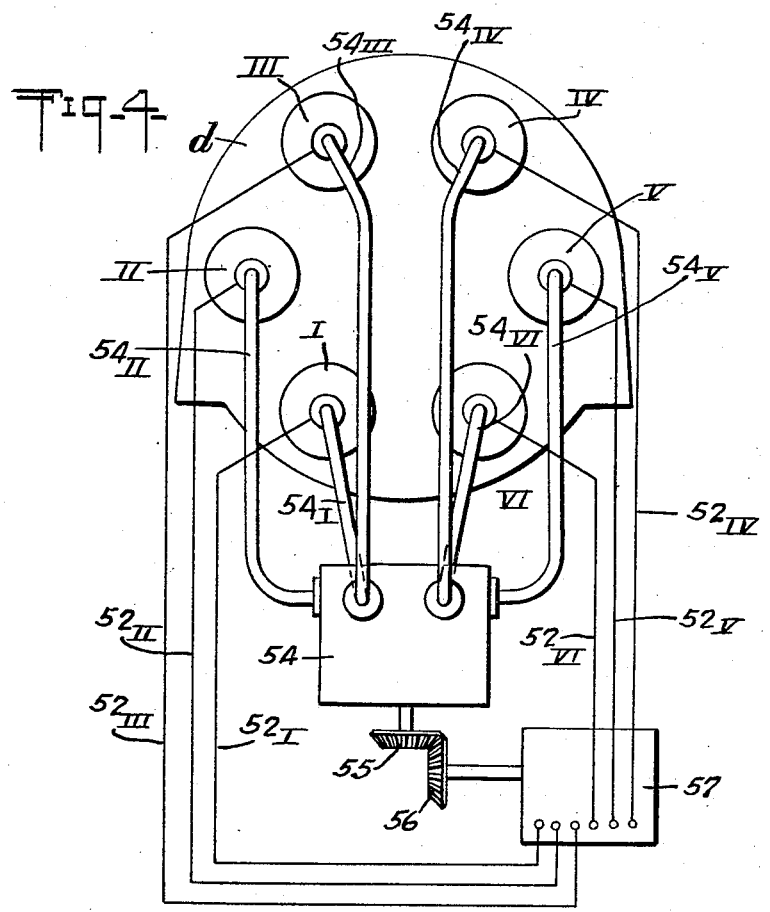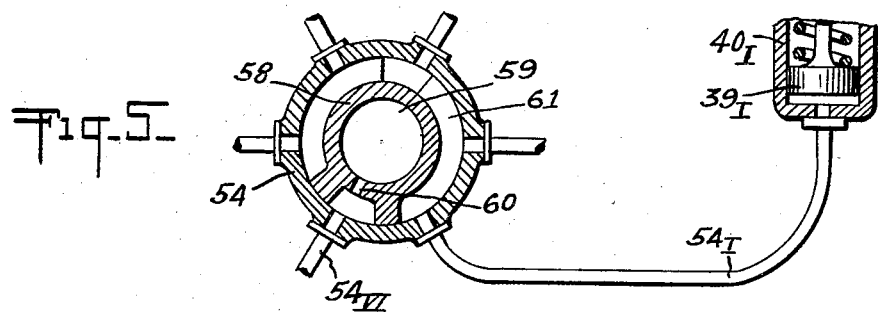

Patented Oct. 22, 1929

1,732,732

UNITED STATES PATENT OFFICE

MICHAEL SEDLMEIR, OF MULHEIM-RUHR, GERMANY, ASSIGNOR TO HOLZWARTH GAS TURBINE CO., OF SAN FRANCISCO, CALIFORNIA, A CORPORATION OF DELAWARE

FUEL VALVE FOR COMBUSTION ENGINES

Application filed August 17, 1926. Serial No. 129,707.

My invention relates to combustion engines and more particularly to combustion turbines and has for its object to provide a valve of novel construction whereby the fuel and particularly fuel of the heavier type such as oil is efficiently atomized prior to its introduction into the combustion chamber of the engine. The invention contemplates further the provision of a fuel valve of the indicated type constructed particularly for efficient operation in oil driven turbines of large size and power. Other more specific objects will appear from the description hereinafter and the features of novelty will be pointed out in the claims.

In the accompanying drawings, which illustrate an example of the invention without defining its limits, Fig. 1 is a longitudinal sectional view of the valve embodied in a turbine; Fig. 2 is a cross-section on the line 2—2 of Fig. 1; Fig. 3 is a similar view on the line 3—3 of Fig. 1 on an enlarged scale; Fig. 4 is a front elevation of a combustion turbine having six explosion chambers, the valve-operating mechanism being shown schematically; and Fig. 5 is a section through the distributor of the valve-operating mechanism and through one of the valves operated thereby.

As shown in the illustrated example the valve comprises a valve casing 10 of generally tubular form provided at its one end with an annular outwardly projecting flange 11 and with radial openings 12 as indicated in Fig. 2. The casing 10 further includes an internal annular shoulder 13 located at its flanged end and in spaced relation to the inner end of a bushing 14 fitted within said casing and extending beyond the same in an axial direction as shown in Fig. 1. The bushing 14 is fixed in place in said casing 10 by means of a ring-nut 15 threaded into the casing and engaging an annular flange 16 of the bushing 14 to force a shoulder 17 of the latter against a cooperating shoulder 18 of said casing 10; as shown in Fig. 1 a suitable packing 19 may be clamped between the shoulders 17 and 18 to provide a fluid tight joint between said casing and bushing.

In the illustrated example of the invention the bushing 14 is mounted in a wall 20 of a valve housing which defines a chamber 21 and forms part of an engine of the indicated class and is secured in place by means of a nut 22 threaded upon the bushing and engaging said wall; the nut 22 draws an external shoulder 23 of the bushing 14 against an internal shoulder 24 of the wall 20 and in addition to its other functions clamps a suitable packing 25 between the shoulders 23 and 24 to render the connection between the wall and bushing fluid tight. The housing defining the valve chamber 21 is suitably secured in place on the engine, in registry with an opening in the wall 26 of the combustion chamber 27, the aforesaid opening serving to accommodate and receive the casing 10 of the valve, as shown in Fig. 1; the annular outwardly projecting flange 11 of the valve casing 10 engages the wall of the combustion chamber which is preferably recessed to receive the same so that the entire valve is clamped in position by the action of the said flange 11 and the nut 22. It will be understood that the engine may comprise a plurality of valve chambers and valves which, together with their associated parts, constitute the complete fuel controlling mechanism whereby the several combustion chambers of said engine are provided with fuel.

At its inner end the bushing 14 is provided with a circumferential flange 28 and is cut away adjacent thereto to form a chamber 29 interiorly of the casing 10; the chamber 29 extends circumferentially of the bushing 14 as shown in Fig. 2, and communicates with a circumferentially extending passage 30 which in turn is in communication with the radial openings 12 of the casing 10. The outer surface of the flange 28 is preferably inclined across the axis of the valve and forms an annular channel 31 which tapers from its lower portion to its upper portion in Fig. 1 of the drawings. Throughout its circumferential extent the channel 31 is in communication with apertures 32 located in a terminal ring or partition $b$ all of which lead to an annular chamber or channel 33 located within the casing 10 between its shoulder 13 and the channelled end of the bushing 14.

As shown in Fig. 1 the chamber 33 is provided with a plurality of annular slit shaped ports 34 directed inwardly preferably at corresponding inclination toward the flanged end of the casing 10. In the preferred arrangement, the chamber 31 and the annular slits 34 are formed by means of suitably shaped terminal rings *a* and *b* and intermediate rings *c* fitted together in surface engagement, as shown in Fig. 1, and secured in place by means of a set screw 34' threaded into the casing 10 and projecting into a recess 35 formed in the terminal ring *b*; it will, of course, be understood that the chamber 31 and the slits 34 may be otherwise constructed, the slits in any case, being relatively narrow, particularly at their exit ends.

At its flanged end the casing 10 is formed with a valve seat 36 which diverges in a direction toward the combustion chamber 27 of the engine, and in cooperation with a correspondingly diverging hollow valve member 37 controls the admission of the fuel into said combustion chamber. The hollow valve member 37 in the illustrated example of the invention, comprises an integral part of a valve stem 38 which is slidably mounted in the bushing 14 and projects beyond the same in an axial direction and is carried by a piston 39 mounted to reciprocate in a cylinder 40. In registry with the slits 34, the valve stem 38 is shaped to provide an annular chamber 41 which surrounds the valve stem and is in communication with the aforesaid slits for the purpose to be more fully set forth hereinafter. Contiguous to this annular chamber 41, the valve stem 38 is provided with a collar 53 projecting outwardly into the interior air space or chamber 41, thus providing a throttle section for the air stream. Adjacent to this collar the stem is formed with an inwardly tapering surface 42 which, in combination with an inwardly tapering surface 43 of the bushing 14, provides a chamber 44 which tapers toward and communicates with the annular chamber 41. The valve stem 38 is further formed with a relatively reduced section 45 which, in conjunction with the registering interior surface of the bushing 14, forms an annular chamber 46 communicating at one end with the chamber 44 and at its other end with a radial opening 47 leading to the interior of the valve chamber 21. For the purpose of guiding the valve stem 38 in its movements relatively to the bushing, as will appear more fully hereinafter, the reduced section 45 of the stem 38 is provided with outwardly extending radial ribs 48 which engage the contiguous inner surface of the bushing 14. A coil spring 49 surrounds the stem 38 and has its one end in engagement with the nut 22 and its other end in engagement with the aforesaid piston 39, said spring serving to maintain the valve member 37 upon its seat 36 and to return it thereto. A nozzle 50 connected with a source of compressed air or other atomizing medium communicates with a passage 51 which leads to the interior of the valve chamber 21. A fuel nozzle 52, suitably fixed in place in the wall of said valve chamber, is connected with a source of fuel such as oil and leads to the circumferential chamber 29, as shown in Fig. 2.

The type of combustion turbine with which the valve is operatively combined in the illustrated example, is of that class in which oil under pressure properly controlled, acts upon the piston 39 to adjust the valve member to its open position at that point in the operative cycle of the engine when fuel is to be introduced into the piston chamber. In the operation of the turbine equipped with the improved valve, air or other atomizing agent, at a pressure of about six atm. flows through the nozzle 50 and completely fills the valve chamber 21. This air or its equivalent, under pressure, passes through the radial opening 47 into the annular chamber 46 and into the tapering chamber 44, from which it flows into the annular chamber 41; as long as the valve member 37 remains upon its seat 36, this air will be maintained in said chamber 41 against escape therefrom. While the valve is closed fuel oil is forced through the fuel nozzle 52 in accurately measured predetermined quantities at pressure sufficient to overcome the obstructing pressure of the aforesaid atomizing air or its equivalent. This fuel oil collects in the chamber 29 and flows through the passage 31 and apertures 32 into the annular chamber 33; the pressure of the air contained in the chamber 41 prevents the oil in the chamber 33 from flowing out through the slits 34. At the moment in the operative cycle of the engine when fuel is to be introduced into the combustion chamber 27, the pressure of the operating oil upon the piston 39 will move the valve stem 38 against the tension of the spring 49 and will shift the valve member 37 away from its seat 36; the described movement of the valve member is relatively slight and is sufficient only to provide an annular passage of restricted dimensions between the valve member 37 and its seat 36. Because of the form of the valve member and its seat, the aforesaid restricted passage will diverge in a direction toward the combustion chamber 27. As soon as this adjusting of the valve member 37 takes place, air under pressure will pass out through the restricted passage and will flow across the exit ends of the slits 34 at a very high velocity. As this occurs, the action of the passing air will draw the oil through the slits 34 in finely divided portions and will act as a carrier for said oil. The pressure of the air or its equivalent which has entered the openings 12 and, therefore, is behind the previously introduced and measured quantity of oil being drawn at this stage through the slits 34, will press against said oil from the rear and force it through the slits 34 which, in a full-sized engine, have a width of only 0.5 mm. The mixture of fuel oil and air or its equivalent, streams through the very narrow annular passage between the open valve member 37 and its seat 36 into the combustion chamber 27; in its flow through the aforesaid restricted passage, the oil is atomized to a still higher degree. As a result of this, a supply of highly vaporized oil mixed with air passes into the combustion chamber in an outwardly expanding annular funnel-shaped mass, all parts of which are projected in directions tending to separate the same and preventing any parts of the aforesaid vaporized mixture from impinging against each other, and thereby again becoming liquefied. Through the medium of a separate control valve which has also been omitted, the filling of the combustion chamber is completed with air under a pressure of about 2½ atm. As soon as the introduction of the highly atomized fuel in the form of a measured charge has been completed, the pressure of the operating oil upon the piston 39 will drop approximately to zero, whereupon the coil spring 49 will operate to restore the valve member 37 to its seat 36. As soon as this occurs, a further charge of oil is introduced into the valve in the manner previously set forth, so as to be ready for vaporization and introduction into the explosion chamber when required. The valve is extremely simple in construction and operation, and is highly efficient as a means for atomizing or vaporizing fuel oil to a very high degree. The valve is particularly adapted for incorporation and use in combustion turbines, and permits the efficient operation of such turbines of large size and power with fuel oil as the operating medium.

In Fig. 4 the numerals I, II, III, IV, V and VI designate the six atomizing valves of a combustion turbine having six individual explosion chambers. Conduits $54_I$ and $54_{II}$ etc. conduct the oil under pressure from the valve controlling and distributing mechanism 54 to the cylinders $40_I$, $40_{II}$, etc. of the valves I to VI. The fuel pump 57 which is synchronized with the distributor 54 by means of the gears 55 and 56 forces the required amount of fuel to the valves through the pipes $52_I$, $52_{II}$, etc.

The oil conduit $54_I$ shown in Fig. 5 alternately supplies the cylinder of valve I with oil under pressure and releases such pressure, the feed of pressure oil taking place when the revolving rotor 58 of the distributor is in a position in which the central pressure space 59 is connected to the conduit $54_I$, through the port 60. The annular channel 61, on the other hand, is connected to the atmosphere, i. e. is not under pressure, so that when the conduit $54_I$ is connected thereto during the rotation of rotor 58 and the pressure in said conduit is released, the valve I becomes closed under the action of its spring, and only the explosion chamber associated with the valve VI is supplied with fuel. The construction and operation of the distributor are more fully disclosed in the United States patent to Holzwarth No. 877,194, and need not be here described in greater detail.

Various changes in the specific form shown and described may be made within the scope of the claims without departing from the spirit of my invention.

I claim:

1. In a combustion turbine, the combination of a combustion chamber, a valve housing, a valve within said housing comprising a valve casing having a valve seat and a movable hollow valve member associated with said casing and including a cylindrical stem and an enlarged head tapering toward said combustion chamber and adapted to engage said seat, said valve member and casing being spaced from each other throughout at least a portion of their length to provide an air channel therebetween, a conduit for connecting said air channel to a source of air under pressure, said valve casing being also provided with a fuel chamber, a conduit for connecting said fuel chamber to a source of fuel and charging mechanism for charging a predetermined quantity of fuel into said fuel chamber during the closed position of said valve, said casing being provided with spaced members defining a plurality of fuel channels in communication with said fuel chamber, said casing being further provided with a plurality of openings inclined to the axis of the valve and located between said fuel channels and said air channel and adapted, when said valve is opened, to discharge fuel in finely divided streams into the current of air crossing the mouths of said openings.

2. The combination set forth in claim 1 wherein said air channel is constricted in cross-section in advance of said openings.

3. The combination set forth in claim 1 wherein said air channel is constricted in cross-section in increasing degree toward said openings in advance thereof.

4. In a combustion turbine, the combination of a combustion chamber, a valve housing, a valve within said housing comprising a valve casing having a valve seat and a movable hollow valve member associated with said casing and including a cylindrical stem and an enlarged head tapering toward said combustion chamber and adapted to engage said seat, means adapted to reciprocate said member rapidly between the closed and open positions of the valve, said valve member and casing being spaced from each other throughout at least a portion of their length to provide an air channel therebetween, said valve casing and housing being similarly spaced to provide an air chamber therebetween, conduits for connecting said air channel and chamber to a source of air under pressure, said valve casing being also provided with a fuel chamber, a conduit for connecting said fuel chamber to a source of fuel, charging mechanism for charging a predetermined quantity of fuel into said fuel chamber during the closed position of said valve, said casing being provided with spaced members defining a plurality of fuel channels in communication with said fuel chamber, said casing being further provided with a plurality of openings inclined to the axis of the valve and located between said fuel channels and said air channel and adapted, when said valve is opened, to discharge fuel in finely divided streams into the current of air crossing the mouths of said openings, said air channel being constricted in cross-section in increasing degree toward said openings in advance thereof, and a connection between said fuel chamber and one of the air spaces defined by said air channel and air chamber, said connection being adapted to conduct compressed air to the upper part of said fuel chamber.

5. In a combustion turbine, the combination of a combustion chamber, a valve housing, a valve within said housing comprising a valve casing having a valve seat and a movable hollow valve member associated with said casing and including a cylindrical stem and an enlarged head tapering toward said combustion chamber and adapted to engage said seat, means adapted to reciprocate said member rapidly between the closed and open positions of the valve, said valve member and casing being spaced from each other throughout at least a portion of their length to provide an air channel therebetween, said valve casing and housing being similarly spaced to provide an air chamber therebetween, conduits for connecting said air channel and chamber to a source of air under pressure, said valve casing being also provided with a fuel chamber, a conduit for connecting said fuel chamber to a source of fuel, charging mechanism for charging a predetermined quantity of fuel into said fuel chamber during the closed position of said valve, ring members in said casing defining a fuel channel which is in communication with said fuel chamber, said ring members having slits therein inclined to the axis of the valve and located between said fuel channel and the air channel, said slits being adapted upon opening of the valve to discharge fuel in finely divided streams into the current of air crossing the mouths of said slits, said air channel being constricted in increasing degree toward said slits and in advance thereof, and a connection between said air chamber and said fuel chamber adapted to conduct compressed air to the upper part of said fuel chamber.

In testimony whereof I have hereunto set my hand.

MICHAEL SEDLMEIR.